United States Patent
Cho et al.

(10) Patent No.: US 8,052,765 B2
(45) Date of Patent: Nov. 8, 2011

(54) CONTOURED PCD AND PCBN FOR TWIST DRILL TIPS AND END MILLS AND METHODS OF FORMING THE SAME

(76) Inventors: H. Sam Cho, Salt Lake City, UT (US); Lee bong Kyu, Gyeonggi-Do (KR); Kim yong Il, Gyeonggi-Do (KR); Han Kyung Ryul, Chungcheongnam-Do (KR); Song Ki Jeon, Chungcheongnam-Do (KR)

( * ) Notice: Subject to any disclaimer, the term of this patent is extended or adjusted under 35 U.S.C. 154(b) by 1195 days.

(21) Appl. No.: 11/732,712

(22) Filed: Apr. 3, 2007

(65) Prior Publication Data
US 2008/0247899 A1    Oct. 9, 2008

(51) Int. Cl.
*B22F 7/00* (2006.01)
*B23B 51/02* (2006.01)

(52) U.S. Cl. ............... 51/293; 51/307; 419/11

(58) Field of Classification Search .......... 51/295; 76/101.1, 108.6, 115; 419/10, 28, 11
See application file for complete search history.

(56) References Cited

U.S. PATENT DOCUMENTS

| | | |
|---|---|---|
| 4,991,467 A | 2/1991 | Packer |
| 5,011,514 A | 4/1991 | Cho et al. |
| 5,020,394 A | 6/1991 | Nakamura et al. |
| 5,031,484 A | 7/1991 | Packer |
| 5,070,748 A | 12/1991 | Packer |
| 5,115,697 A | 5/1992 | Rodriguez et al. |
| 5,226,760 A | 7/1993 | Nishimura |
| 5,272,940 A | 12/1993 | Diskin |
| 5,297,456 A | 3/1994 | Nishimura |
| 5,580,196 A | 12/1996 | Thompson |
| 5,676,496 A | 10/1997 | Littecke et al. |
| 5,685,671 A | 11/1997 | Packer et al. |
| 5,690,706 A * | 11/1997 | Sigalas et al. .......... 51/307 |
| 5,725,333 A | 3/1998 | Abe et al. |
| 5,807,032 A | 9/1998 | Abe |
| 5,868,885 A * | 2/1999 | Crockett et al. .......... 156/89.27 |
| 6,152,657 A * | 11/2000 | Packer et al. .......... 407/32 |
| 6,152,660 A | 11/2000 | Papajewski |
| 6,158,304 A * | 12/2000 | Packer et al. .......... 76/104.1 |
| 6,346,689 B1 * | 2/2002 | Willis et al. .......... 219/407 |
| 6,663,326 B1 | 12/2003 | Hiroyasu et al. |
| 2002/0159851 A1 * | 10/2002 | Krenzer .......... 408/230 |
| 2006/0243495 A1 * | 11/2006 | Duscha et al. .......... 175/323 |

FOREIGN PATENT DOCUMENTS

| | | |
|---|---|---|
| KR | 10-1999-0021863 | 3/1999 |
| KR | 10-1999-0028197 | 4/1999 |
| KR | 10-2004-0102009 | 12/2004 |

* cited by examiner

*Primary Examiner* — Jerry Lorengo
*Assistant Examiner* — Jared Wood
(74) *Attorney, Agent, or Firm* — Thorpe North & Western LLP

(57) ABSTRACT

Contoured solid polycrystalline superabrasive material such as twist drill tips and endmill flank segments can be formed by preparing a precursor mold having a plurality of shaped openings each corresponding to a predetermined shape. A specially prepared charge feed can be placed into the shaped openings to form a charged precursor. The charge feed can include a substantially homogeneous mixture of superabrasive source particulates, sintering binder, and optional inorganic bonding medium. A loaded reaction cup-assembly including the charged precursor can be subjected to a pressure, temperature and time sufficient for sintering and formation of the contoured polycrystalline superabrasive material. Reduced finishing steps and increased tailorability of grade and quality of final polycrystalline products can be readily achieved.

13 Claims, 2 Drawing Sheets

CONTOURED PCD AND PCBN FOR TWIST DRILL TIPS AND END MILLS AND METHODS OF FORMING THE SAME

FIELD OF THE INVENTION

The present invention relates generally to cutting tools and particularly to superabrasive cutting tools such as drill bits and end mills. Thus, the invention involves the fields of cutting tools, superabrasive materials, materials science, and metallurgy.

BACKGROUND OF THE INVENTION

Polycrystalline superabrasive materials like PCD and PCBN have been widely used for years in both metalworking and woodworking industries by virtue of their unique mechanical and physical properties. These superabrasive materials tend to have a high abrasive resistance, high toughness, and high hardness. However, these superabrasive materials have not been effective in other cutting tool industry especially in milling and drilling applications due primarily to availability and cost factors.

The main drawback is related to the unique design or shape of tool products in which the cutting face of PCD or PCBN is fluted or helical shaped for an effective cutting performance. Unfortunately, helical shapes are not readily fabricated from PCD or PCBN under HPHT sintering process due to complexity in cell designs in combination with their superhard material characteristics. Furthermore, any conventional shaping process in an attempt to put the flute or helical shape into a superabrasive material by finishing operations such as grinding is a very tedious and costly process. This is true even with superabrasive parts having a nearly net shape of a desirable final product design.

Historically, one main barrier preventing diamond or PCD tools from penetrating the market against conventional tool materials like either high speed steel or carbide has been the manufacturing cost. Currently, veined PCD drills made according to U.S. Pat. No. 5,580,196 of Abrasive Technology is an upgrade product over electroplated CVD coated or fabricated drills especially in aerospace and automotive industry. However, it has been reported that product life of these materials is short from failing fabrication joints and a lack of a rugged edge. In addition, the price of this tool is very expensive so that many potential consumers are reluctant to try.

Megadiamond has introduced carbide inserts with veins of PCD but which are only one inch long which requires a braze point to a carbide rod/shank of the same diameter. However, this is a mechanical weakness and makes flute grinding difficult, especially on automated grinders. Another weakness of these veined PCD end mill cutters is that they cannot resharpen an expensive tool because the PCD insert is too shallow. In short, although some progress has been made in the past few years, the rotary tool market within the cutting tool industry has long desired both the helical or fluted PCD drill tip and a reliable PCD fluted end mill that are cost competitive and reliable in tool performance over the existing superabrasive tools.

SUMMARY OF THE INVENTION

This invention relates to a new helical shaped solid PCD and PCBN tip that can be attached to the conventional tool substrates such as twist drills, drills, and end mills. The helical PCD twist drill tip materials of the present invention are significantly improved in both product design and material versatility. Furthermore, the manufacturing cost of a final tool is cheaper than conventional PCD tips at least partially due to production of near to net shape pieces using the methods of the present invention. More importantly, the manufacture of helical/fluted PCD and PCBN is relatively easier to fabricate under HPHT process. Therefore, the present invention overcomes many of disadvantages associated with current HPHT PCD sintering and followup product shape forming process.

The helical PCD drill and fluted endmills of the present invention can be a viable alternative for existing products in drilling and milling applications for the cutting tool industry. Accordingly, the present invention provides materials and methods for manufacturing of ultrahard materials and tools which are far better in both quality and utility and more cost effective than comparable conventional materials.

In accordance with one aspect of the present invention, a helical PCD or PCBN twist drill tip can be a solid PCD or PCBN with no metal layer backing. The end mill tips can also be either helical solid PCD or PCBN material.

The solid contoured PCD and PCBN materials of the present invention can be formed by a method which includes charging reaction cup assembly with a specially prepared powder form of ultrahard materials (diamond or CBN, sintering aids, bonding medium, etc.). This reaction cup assembly can be formed of precursors which include molds having several helical shaped spaces to be occupied by the ultrahard materials and associated sintering aids. The form material can be made of materials such as graphite, MgO, salt, HBN, etc. In some aspects of the present invention, the superabrasive starting materials can be either crushed PCD material or agglomerated diamond material. The cup assembly having the shaped precursor feed charge can be loaded in a conventional HPHT cell and subjected to a pressure, temperature and time conditions suitable for diamond synthesis or PCD/PCBN sintering.

In another aspect of present invention, a solid PCD or PCBN can be manufactured from a near-to-shape solid PCD or PCBN from HPHT pressing by a modified method of cutting and grinding operations.

The contoured and helical shaped solid polycrystalline superabrasive products of the present invention can be useful for a broad range of rotary diamond cutting tool applications in both metalworking and woodworking industries, and especially for drilling and milling for both ferrous and nonferrous materials where conventional tools like HSS and WC tools (drills, end mills, reamers and the like) are dominant but not performance-effective at the present time.

The products of the present invention are economically and technically viable product when compared to existing PCD related tools being commercialized currently even in limited amounts. The methods of the present invention are technically reliable and tailorable in making various sizes and product grades that have so far been technically limited by current manufacturing processes. Therefore, the utility of products made in accordance with the present invention can be much broader and easily offered to meet market demands. A final tool using this new product is manufactured more cost effectively, requiring much less grinding time, for example, in CNC grinding during final tool fabrication.

Further benefits to current cutting tool industry can be provided in a way that a flexibility of tool designs with both helical (fluted) PCD and PCBN drills and endmills to much broader application areas like aircraft and automotive industries. In addition, the methods of the present invention offer a wide selection of PCD and PCBN grades that are suitable for ever increasing demand for newly developed workpiece shapes and materials.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings and claims, or may be learned by the practice of the invention.

Figure 1:
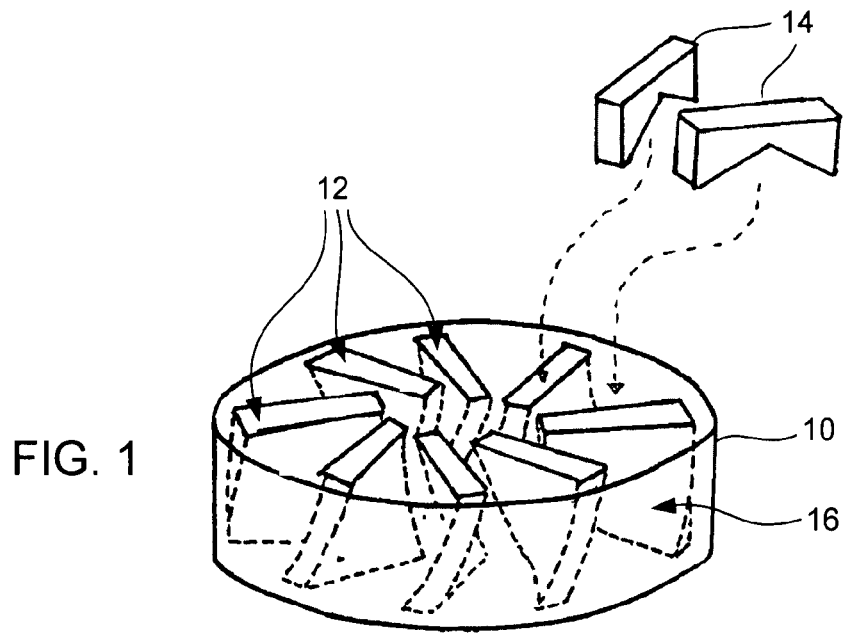
FIG. 1 shows a precursor mold having multiple helical shaped openings corresponding to multiple helical drill tips that will be filled with specially prepared diamond powder for sintering PCD or PCBN of near-to-shape solid body and a set of caps which cover the powder particulate feed charge to provide an upper surface shape in accordance with one embodiment of the present invention.

The drawings will be described further in connection with the following detailed description. Further, these drawings are not necessarily to scale and are by way of illustration only such that dimensions and geometries can vary from those illustrated.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a," "an," and "the" include plural referents unless the context clearly dictates otherwise. Thus, for example, reference to "a precursor" is not to be taken as quantitatively or source limiting and reference to "a charging step" or "heating step" may include multiple steps.

Definitions

In describing and claiming the present invention, the following terminology will be used in accordance with the definitions set forth below.

As used herein, "contoured" refers to surfaces which are non-planar having curved topology. Typically, the products of the present invention include helically contoured segments, although other curved shapes can also be suitable for some tool applications.

As used herein, "superabrasive" refers to abrasive materials which are ultrahard such as diamond, CBN and polycrystalline diamond (PCD) or CBN (PCBN). Further, the terms superabrasive and PCD are often used interchangeably herein unless the context specifically indicates otherwise.

As used herein, "inorganic bonding medium" refers to a material which acts as a matrix for sintering or as a filler material in which diamond particles are dispersed. Typically, the bonding medium can chemically bond with the sintering aid and/or diamond particles, although some mechanical bonding is often also present.

As used herein, "precursor" refers to a mass prior to a relevant action. For example, a charged precursor includes raw particulate materials prior to subjection to HPHT sintering conditions.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

As used herein, "about" refers to a degree of deviation based on experimental error typical for the particular property identified. The latitude provided the term "about" will depend on the specific context and particular property and can be readily discerned by those skilled in the art. The term "about" is not intended to either expand or limit the degree of equivalents which may otherwise be afforded a particular value. Further, unless otherwise stated, the term "about" shall expressly include "exactly," consistent with the discussion below regarding ranges and numerical data.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 4 percent to about 7 percent" should be interpreted to include not only the explicitly recited values of about 4 percent to about 7 percent, but also include individual values and sub-ranges within the indicated range. Thus, included in this numerical range are individual values such as 4.5, 5.25 and 6 and sub-ranges such as from 4-5, from 5-7, and from 5.5-6.5, etc. This same principle applies to ranges reciting only one numerical value. Furthermore, such an interpretation should apply regardless of the breadth of the range or the characteristics being described.

Embodiments of the Invention

The present invention encompasses methods of making a contoured solid polycrystalline superabrasive material. Referring now to FIG. 1 a precursor mold 10 can be prepared having a plurality of shaped openings 12 each corresponding to a predetermined shape. The precursor mold can be formed by any suitable technique such as, but not limited to, casting, molding, 3D printing, carving of a solid material e.g. by laser or wire EDM, or other suitable manufacturing techniques. The precursor mold can comprises or consist essentially of a material selected from the group consisting of graphite, hexagonal boron nitride, alumina, ceramics, composites or alloys thereof or combinations of these materials. The choice of mold material can depend on the type of polycrystalline material being formed, rigidity, cost, or the like. For example, graphite molds can be preferred for formation of PCD materials while hBN molds can be preferred for formation of PCBN. Optionally, the precursor mold can further include sintering aids which can diffuse into the particulate charge feed during sintering. However, generally any material having sufficient mechanical strength to resist excessive deformation or shrinkage during HPHT processing can be used, e.g. salt, talc and or other materials can be useful in some embodiments.

The mold can be designed to include shaped openings having any number of predetermined shapes. FIG. 1 illustrates predetermined shapes corresponding to a helical shaped drill tip segment. Generally, the helical shaped segment can be a drill bit tip segment twisted about a central axis of rotation by about 5° to about 40° from planar, and preferably about 8° to about 20°. Edges of the drill tip segment can be contoured so as to blend with contours of a corresponding fluting on a drill bit body. In order to form a tip portion of the tip segment, mold caps 14 can be oriented over the particulate charge feed 16 in order to further shape the particulate material. Regardless of the particular predetermined shape, the predetermined shape is typically slightly larger than the desired final shape in order to compensate for shrinkage during sintering.

Figure 2:
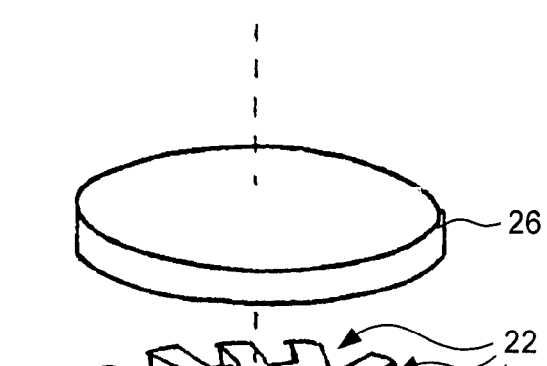
FIG. 2 shows a precursor mold having multiple openings of helical shape endmill tips and corresponding cylindrical disc and base for surrounding the mold in accordance with another embodiment of the present invention.
Figure 2:
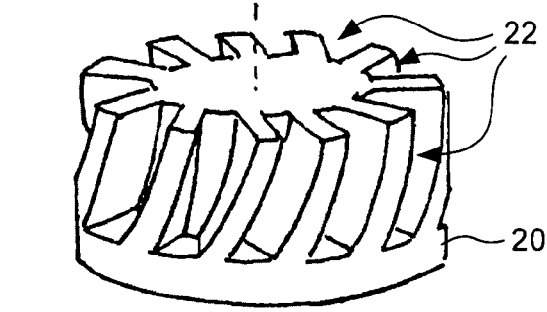
Figure 2:
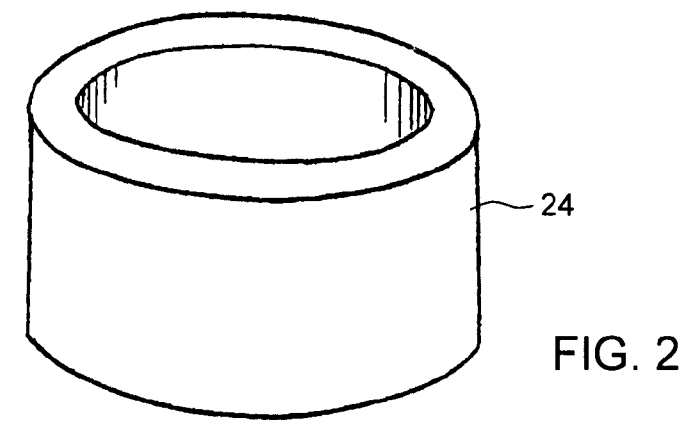

FIG. 2 illustrates another embodiment of the present invention where the precursor mold 20 includes shaped openings 22 corresponding to a helical end mill fluting segment. In this case an annular sheath 24 and top plate 26 can provide convenient cup assembly walls to confine the particulate charge feed by placing the precursor mold within the sheath and covering the mold with the top plate. In this case the precursor mold can be made of materials as discussed previously, while the sheath and top plate can be formed of suitable refractory metals such as Ti, Mo, etc.

A specially prepared charge feed can be placed into the shaped openings to form a shaped charge feed within a charged precursor (i.e. the mold precursor plus the charge feed). The specific composition and configuration of the charge feed can be readily tailored for formation of a polycrystalline superabrasive material having a desired quality and properties. As a general matter, the charge feed can include, or consist essentially of, a substantially homogeneous mixture of superabrasive source particulates, sintering binder, and optional inorganic bonding medium.

The superabrasive source particulates can include diamond, CBN, PCBN, polycrystalline diamond, or any other material which acts as a source material for superabrasive material, i.e. diamond sinters to form PCD and CBN sinters to form PCBN. In one alternative embodiment, the superabrasive particulates are crushed polycrystalline powders produced by crushing of polycrystalline diamond or polycrystalline boron nitride. These polycrystalline particulates can be prepared from crushing of typical PCD that is selected for the desirable properties of the final tool. In another embodiment, the diamond particulate powder for the feed charge can be preprepared to be somewhat coarser in size from a typical powder agglomeration process in order to improve the powder packing efficiency in loading into the precursor. For example, 40/50 mesh to about 300/400 mesh can be combined to prepare bimodal or trimodal feed charges, although up to about 10/20 mesh can be used. An original powder formed from a mixture of various fine diamond powder sizes combined with a bonding medium as well as a sintering aid like cobalt with a presence of organic binders like wax for easy forming into a suitable round mold (e.g. a refractory metal cup like Ti or Mo). The preform of this initial diamond feed mixture is then dewaxed followed by heat treatment at 1100-1200° C. for 30 minutes under a high vacuum state to form an agglomerate. In the agglomerate, the diamond or CBN is typically not sintered; however, the sintering aid melts and flows to form a cementing matrix around the unsintered particles. It can then be crushed into the agglomerate particles of rather coarse sizes such as 30-80 mesh particulates. The initial diamond powder size (0.5-400 microns), diamond vol. % (30-90 vol. %), binder concentration (50%-1 vol %), bonding medium (like carbide powder) concentration can be varied in a broader range depending on the desired final PCD product properties. For example, a tougher PCD can have 65 vol % to 99 vol %, while a softer PCD can have less than 60 vol % diamond. The crushed particles of either polycrystalline or agglomerates can be substantially free of metal. Removal of metals can be accomplished by acid leaching or other suitable approaches.

The specially prepared charge feed can further be configured in order to increase packing density and reduce void space. In one currently preferred embodiment, the charge feed can include a trimodal distribution of superabrasive particles. For example, a trimodal mixture of 40/50 mesh, 100/120 mesh and 230 mesh superabrasive source particulates can provide good results. As a general rule, the diamond or superabrasive source particles can have almost any useful size. Typically, the diamond particles can have a size from about 0.5 µm to about 500 µm, and although other sizes can also be used. For example, 120 to 200 µm diamond can facilitate production of larger PCD segments having a high quality and uniform sintering throughout.

The diamond content of the particulate feed charge can be from about 30 vol % to about 95 vol %, and preferably from about 50 vol % to about 90 vol %. Although in some cases it can be desirable to include significant portions of filler material such as bonding medium or other materials.

The sintering aid can be any material which acts to facilitate sintering under HPHT conditions. Non-limiting examples of sintering aids for diamond can include Co, Ni, Fe, Mn, Cr, and alloys thereof with Fe, Ni and Co being currently preferred. Non-limiting examples of sintering aids for cubic boron nitride can include an alkali metal nitride, alkaline earth metal nitride, Al—Si alloys and the like. For example, lithium, calcium, magnesium, and nitrides of alkali and alkaline earth metals such as $Li_3N$, $Ca_3N_2$, and $Mg_3N_2$ can be useful as sintering aids for PCBN. Typically, the sintering aid can be present in the particulate feed charge at about 1 vol % to about 30 vol %.

Non-limiting examples of suitable bonding medium materials can comprise or consist essentially of, cubic boron nitride, tungsten carbide, boron, silicon nitride, tantalum carbide, silicon carbide, alumina, combinations thereof, and the like. The inorganic bonding medium can be any material which provides sufficient hardness and acts as a medium for bonding of the diamond particles in fixed positions relative to one another and can affect the final PCD thermal stability, toughness and hardness. As a general guideline, inorganic bonding medium that provides sufficient hardness and acts as a medium for bonding of the diamond particles can be present in the particulate feed charge from about 1 vol. % to about 20 vol. % and preferably from about 2 vol. % to about 15 vol. %. In one specific embodiment, the inorganic bonding medium can be tungsten carbide powder that can typically have a size from about 0.5 micron to about 20 microns.

The particulate feed charge can then be placed into the shaped openings of precursor to form a charged precursor.

The reaction cup assembly comprises the uniquely made mold precursor having multiple desirably shaped (e.g. helical) partitions or openings. The precursor mold is loaded with the diamond particulates by filling the openings. Suitable caps, plates or other members can be used to fully encapsulate the charged particulate material. The charged precursor can then be prepared to form a reaction cup-assembly suitable for use in a HPHT apparatus. The charged precursor can be directly placed in a HPHT apparatus or prepared by including various conventional gaskets, cup layers, and the like.

The loaded reaction cup-assembly can then be subjected to a pressure, temperature and time sufficient for sintering and formation of the contoured polycrystalline superabrasive material. Any suitable HPHT apparatus can be used such as, but not limited to, piston-cylinder, multi-anvils, belt devices, and any other suitable high pressure press. Although specific conditions can vary, depending on the feed charge composition, the temperature of typical PCD/PCBN sintering is from about 1250° C. to about 1450° C. and the pressure is from about 40 kb to about 55 kb. Typical sintering time once the sintering temperature is reached is from about 1.0 minute to about 30 minutes.

Figure 3:
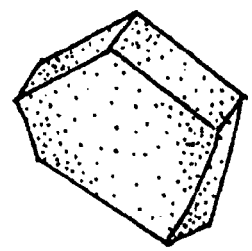
FIG. 3 is a perspective view of a final PCD helical drill tip segment removed from the mold of FIG. 1 in accordance with another embodiment of the present invention.
Figure 4:
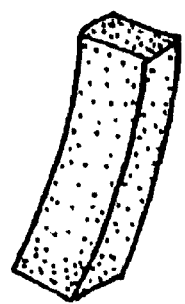
FIG. 4 shows an ideal helical shape PCD or PCBN endmill cutting edge segment removed from the mold of FIG. 2 after sintering in accordance with another embodiment of the present invention.

Subsequent to sintering, the contoured polycrystalline superabrasive material segments can be removed from the HPHT apparatus and from the cup assembly. This can be done by mechanical breaking of the precursor mold and/or chemical rinsing to dissolve non-polycrystalline portions of the pressed mass. The recovered segments are typically near net shape and often require little or no further finishing for practical use. For example, the precursor mold 10 of FIG. 1 results in contoured drill bit tip segments as illustrated in FIG. 3. Similarly, the precursor mold 20 of FIG. 2 results in a contoured endmill flank segment as shown in FIG. 4. In some cases the contoured polycrystalline superabrasive material can be further finished by grinding and cutting to form a final helical shape drill bit tip or end mill segment. This typically involves only minor material removal in order to polish edges, remove extraneous artifacts, and/or to fine tune fit for a particular tool substrate.

Alternatively, the predetermined shape can be configured so as to produce pieces which are not near net shape, but rather require additional grinding and cutting operations to form the final tool segment. However, such pieces still require significantly less finishing steps to produce a helical solid PCD than conventional grinding from a solid blank PCD.

In accordance with the present invention, the contoured polycrystalline superabrasive material can have a superabrasive content of about 90 vol. % to about 98 vol. %, and generally about 30 vol. % to about 98 vol. %. As mentioned previously, the methods of the present invention allow for much greater control over product grade and quality at least partially by improving pressure distribution throughout the precursor during HPHT conditions. It has been an inherent process drawback for typical HPHT PCD sintering method to produce odd shapes like helical PCD using a conventional cell design. Poorly sintered PCD would result from weak bond strengths between diamond grains (diamond-to-diamond or diamond-to-medium grain). In other words, the weak bond strength is believed to be due to insufficient local pressure at the grain boundary of diamonds in PCD during HPHT sintering. This is in turn due to difficulties in achieving the necessary packing of diamond powder in the reaction-cup when varying geometry from a standard blank or supported PCD during the HPHT sintering. Consequently, the resultant pressure applied into the localized grains under a conventional HPHT cell assembly is not sufficient enough to maintain desirable HPHT reaction conditions at the grain interfaces for proper diamond-to diamond bonding such that the overall PCD quality is poor.

The finished contoured segments of the present invention can optionally be further treated in order to improve bonding with a desired tool substrate, e.g. a tip of a fluted drill bit shank or flanks of an end mill shank. For example, the contoured polycrystalline superabrasive material can be coated with a brazeable carbide or nitride forming material. Suitable brazeable materials can include, but are not limited to, transition metals (e.g. Co, Cr, Ni, Ta, Ti, W, Mo, etc.), steels, and their alloys.

In another optional aspect of the present invention, the contoured polycrystalline superabrasive materials can be acid leached in order to remove residual metals. This can increase the high temperature thermal stability of the material by removing and/or reducing the amount of residual sintering aid present in the material which may act to backconvert diamond to graphite under high temperature drilling or milling.

Figure 5:
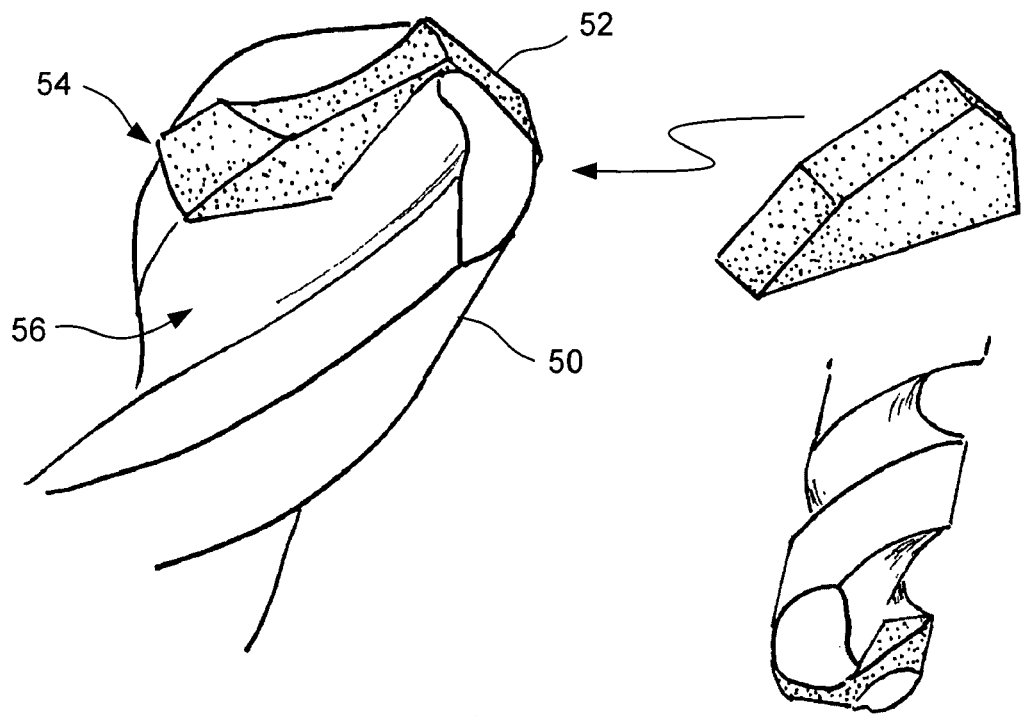
FIG. 5 shows a perspective view of a helical PCD drill having a helical solid PCD tip brazed thereon in accordance with one embodiment of the present invention.
Figure 6:
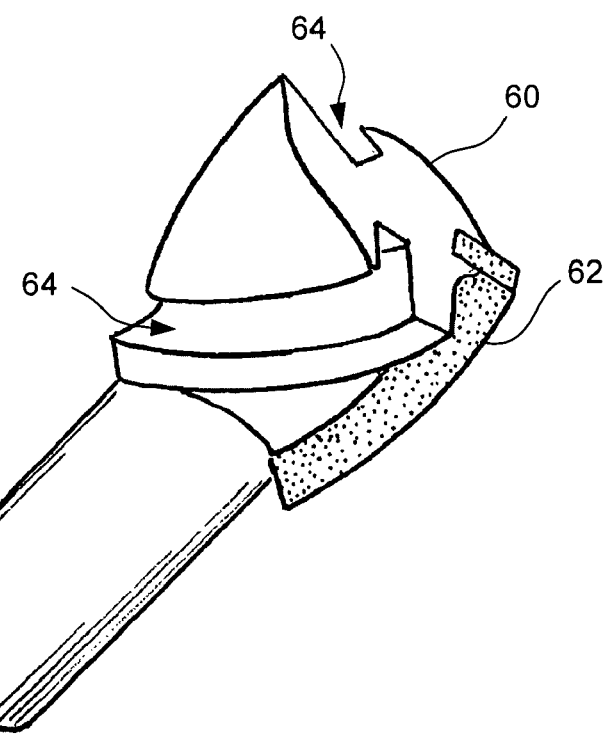
FIG. 6 shows a perspective view of a helical PCD endmill having a helical solid PCD endmill blade brazed thereon in accordance with one embodiment of the present invention.

The final contoured segments can then be brazed or otherwise attached to a suitable tool substrate. FIG. 5 illustrates a two-fluted drill bit shank 50 having a contoured drill bit tip 52 set into a preformed groove near the tip of the shank. In this embodiment the tip segment 52 is also shown separately where the side edges 54 are shaped so as to blend into and match the contours of the fluting 56 in the shank 50. FIG. 6 illustrates a standard endmill shank 60 having a contoured endmill flank segment 62 set into one of three flank grooves 64.

In accordance with the present invention, one optional method of making a contoured solid polycrystalline superabrasive material can include providing an electrically conductive polycrystalline superabrasive blank. The polycrystalline superabrasive blank can be wire electro-discharge machined to form a contoured solid polycrystalline superabrasive material having a predetermined shape. Wire electro-discharge machining includes wire EDM, EDG, wire erosion, or other similar electrode erosion techniques. In this way, the blank can be a freestanding polycrystalline superabrasive material which does not require a supporting substrate such as a carbide substrate. Relatively complex shapes and contours can be introduced into the polycrystalline material using such techniques. For example, endmill segments can be cut from an annular sleeve similar to sheath 24 of FIG. 4 where the segments can be cut directly from the sleeve with little or no excess material. Similarly, drill tip segments can be cut from a solid blank by curved slicing of a PCD blank. A wire EDM machine is particularly useful for machining drill tip segments and endmill segments. In order to effectively use wire EDM, the polycrystalline blank must be sufficiently electrically conductive to allow electro-discharge machining to occur. This can be accomplished by introducing conductive bonding medium and/or sintering aid into the presintered green body and then machining prior to any metal removal steps such as acid leaching.

The present invention as described herein allows a number of achievements in making shaped polycrystalline PCD or PCBN segments to be applied for a variety of drilling and milling tools such as a tip for rotary diamond tools like drills, reamers, burrs, and endmills such as end- and face-milling tools such as flat bottom, ball nose, radius, inverted radius, and chamfer tools. First, a variety of grades of PCD can be readily produced and thermally stable helical PCD tip can be produced that is relatively unique in microstructure having improved thermomechanical properties. Second, a desirable helical product shape for higher performance can be readily obtained. Third, economics of furnishing a finished diamond tool of helical PCD cutting element is improved. The improved price competitiveness comes from both a unique HPHT PCD process cell design and considerably simpler finishing (grinding/cutting) operations for a finished tool as compared to current methods of fabrication which are more labor intensive and include expensive finishing costs.

EXAMPLES

The following examples illustrate exemplary embodiments of the invention. However, it is to be understood that the following are only exemplary or illustrative of the application of the principles of the present invention. Numerous modifications and alternative compositions, methods, and systems may be devised by those skilled in the art without departing from the spirit and scope of the present invention. The appended claims are intended to cover such modifications and arrangements. Thus, while the present invention has been described above with particularity, the following examples provide further detail in connection with what is presently deemed to be practical embodiments of the invention.

Example 1

A specially prepared diamond feed was made by granulation steps started from a mixture of diamond having an average particle size of 20~45 μm, tungsten carbide powder of an average size of 2 μm and a cobalt powder of 1 μm in a content ratio of 75:20:5 wt %. This particulate mixture was compacted, heated (including dewaxing and cementing), and then crushed. This specially granulated and crushed diamond feed was about 70 wt % of 40~60 mesh composite particulates with a small percentage of 120/140 mesh and −325 mesh particulates in 20 wt % and 5 wt %, respectively.

At the same time, a precursor assembly (similar to FIGS. 1 and 2), tantalum cup, salt bushing, graphite heater tube, and other inner/outer cell parts of HPHT reaction cell were also prepared in a conventional manner to form a precursor assembly. The precursor of multiple helical partitions corresponding to drill tips was made of alumina that was of a sintered grade for sufficient stiffness during HPHT processing. The diamond feed was then premixed with the above composite granulated diamond feed, a bonding medium, and binder in a 95:3:2 weight ratio and loaded into the preshaped openings of the precursor mold and closed with the alumina cap (as in FIG. 2) to form an HPHT reaction cell.

The HPHT reaction cell with the loaded reaction cup assembly was placed in a conventional HPHT hydraulic press. The pressure was raised to about 50 kb and then the temperature was elevated to around 1400° C. After being maintained for about 10 minutes, the temperature was lowered and the pressure was gradually reduced. The resulting consolidated helical solid PCD discs were recovered from the cell.

Individual solid helical PCD discs were recovered from the cell by breaking apart. Some of the pieces were not easily separated from the precursor mold although the inner surface of the preshaped openings was coated by HBN spray for improved detachment. Some of the PCD pieces were slightly distorted such that those pieces will need minor grinding to correct the contoured shape. The individual solid helical PCD appear to be good quality and typical shiny grey color PCD. Some of these pieces were also acid treated partially or entirely in order to remove the metal phases in between diamond grains depending on its planned utility.

Example 2

Example 1 was repeated with a specially prepared diamond feed but its original diamond feed powders were crushed PCD grits or particulates rather than a typical fine diamond powder of Example 1. Both entirely acid leached crushed PCD particulates and unleached crushed PCD particulates were used in a diamond feed for these examples. The preparation of the final diamond feed and loading into the reaction cup assembly was made under the same procedures as in Example 1. The subsequent HPHT PCD sintering was also conducted as in Example 1. The two types of solid helical shape PCD discs were produced and both materials exhibited the same grey and shiny color appearance on their surfaces.

One of solid discs was shaped by typical grinding to clean the edges and was then vacuum brazed onto the tip of a twist drill (8 mmΦ drill rod) using a commercially available Ti—Ni—Au brazing alloy at 1100° C.

Of course, it is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function and manner of operation, assembly and use may be made without departing from the principles and concepts set forth herein.

What is claimed is:

1. A method of making a contoured helical shaped solid polycrystalline superabrasive material comprising the steps of:
    a) preparing a precursor mold having a plurality of shaped openings each corresponding to a predetermined helical shape of a drill tip segment or an end mill fluting segment;
    b) placing a specially prepared charge feed into the helical shaped openings to form a shaped charge feed within a charged precursor, said charge feed including a substantially homogeneous mixture of superabrasive source particulates, sintering binder, and optional inorganic bonding medium;
    c) preparing a loaded reaction cup-assembly including the charged precursor;
    d) subjecting the loaded reaction cup-assembly to a pressure, temperature and time sufficient for sintering and formation of the contoured helical shaped drill tip segment or an end mill fluting segment of polycrystalline superabrasive material; and
    e) recovering said helical shaped segments from said reaction cup-assembly for attachment into grooves of a drill bit shank or end mill shank.

2. The method of claim 1, wherein the precursor mold comprises a material selected from the group consisting of graphite, hexagonal boron nitride, alumina, ceramics, and composites or alloys thereof.

3. The method of claim 1, wherein the predetermined helical shape is a drill tip segment.

4. The method of claim 1, wherein the predetermined helical shape is an end mill fluting segment.

5. The method of claim 1, wherein the superabrasive particulates are crushed powders produced by crushing of polycrystalline diamond or polycrystalline boron nitride.

6. The method of claim 5, wherein the polycrystalline diamond or polycrystalline boron nitride is substantially free of metal.

7. The method of claim 1, wherein the contoured polycrystalline superabrasive material has a superabrasive content of about 90 vol. % to about 98 vol. %.

8. The method of claim 1, wherein the contoured polycrystalline superabrasive material has a superabrasive content of about 20 vol. % to about 60 vol. %.

9. The method of claim 1, wherein the specially prepared charge feed includes a trimodal distribution of superabrasive particles.

10. The method of claim 1, further comprising the step of finishing the contoured helical shaped polycrystalline superabrasive material by grinding and cutting to form a final helical shape drill tip or end mill segment.

11. The method of claim 1, further comprising the step of coating the contoured helical shaped polycrystalline superabrasive material with a brazeable carbide or nitride forming material.

12. The method of claim 1, further comprising the step of acid leaching the contoured helical shaped polycrystalline superabrasive material in order to remove residual metals.

13. The method of claim 1, wherein the contoured polycrystalline superabrasive material has a superabrasive content of about 30 vol. % to about 98 vol. %.

* * * * *